US007477141B2

(12) United States Patent
Roberts

(10) Patent No.: US 7,477,141 B2
(45) Date of Patent: Jan. 13, 2009

(54) MODULATED VEHICLE SAFETY LIGHT SYSTEM

(76) Inventor: Douglas Roberts, 15106 SE. 40th Pl., Bellevue, WA (US) 98006

( * ) Notice: Subject to any disclaimer, the term of this patent is extended or adjusted under 35 U.S.C. 154(b) by 290 days.

(21) Appl. No.: 11/600,702

(22) Filed: Nov. 15, 2006

(65) Prior Publication Data

US 2008/0111673 A1     May 15, 2008

(51) Int. Cl.
*B60Q 1/44*     (2006.01)
(52) U.S. Cl. .................... 340/479; 340/467; 340/815.45
(58) Field of Classification Search ................. 340/479, 340/467, 464, 468, 815.45
See application file for complete search history.

(56) References Cited

U.S. PATENT DOCUMENTS

| | | | | |
|---|---|---|---|---|
| 4,667,177 | A | 5/1987 | Athalye | 340/71 |
| 4,806,782 | A | 2/1989 | Bernal | 307/10 |
| 5,148,147 | A | 9/1992 | Kobres | 340/464 |
| 5,610,479 | A | 3/1997 | Schmitt | 315/226 |
| 5,610,578 | A | 3/1997 | Gilmore | 340/479 |
| 6,100,799 | A | 8/2000 | Fenk | 340/467 |
| 6,133,852 | A | 10/2000 | Tonkin | 340/903 |
| 6,150,933 | A | 11/2000 | Matsumoto | 340/479 |
| 6,351,211 | B1 | 2/2002 | Bussard | 340/468 |
| 6,693,525 | B1 | 2/2004 | McIlvain | 340/479 |
| 6,693,526 | B1 | 2/2004 | Puccio | 340/479 |
| 7,002,459 | B1 | 2/2006 | Escandón | 340/467 |
| 7,002,460 | B2 | 2/2006 | Bolander et al. | 340/479 |
| 2005/0162265 | A1* | 7/2005 | Werner et al. | 340/468 |

* cited by examiner

*Primary Examiner*—Brent Swarthout
(74) *Attorney, Agent, or Firm*—Merchant & Gould PC

(57) ABSTRACT

A system, method and apparatus for modulated control of a vehicle lighting systems is useful for brake lights and/or running lights in a motor vehicle. Various vehicle operating parameters are monitored to determine an appropriate modulation control mode for the vehicle. In some examples, the engine speed (e.g., in revolutions-per-minute or rpm) or vehicle speed (e.g., in miles-per-hour or mph, kilometer-per-hour or kmh, etc.) is used as a parameter for modulated control of the lighting system. The modulated control scheme is used to control any number of features of the lighting system including illumination color, illumination intensity, selection of sequence illumination pattern, and adjustment of sequence rate. The modulated control scheme may be applied to off-road buggy whip-lights or other aesthetic vehicle lights and safety enhancements. The modulated control scheme may be applicable for off-road and on-road vehicle applications where localized government ordinances permit.

47 Claims, 14 Drawing Sheets

MODULATED VEHICLE SAFETY LIGHT SYSTEM

FIELD OF THE INVENTION

The present disclosure generally relates to brake light systems that are useful for motor vehicles such as off-road vehicles and on-road vehicles. More particularly, the present disclosure is related to motor vehicle brake running lights, also referred to as rear tail lights, which are arranged to change their appearance based on a vehicles engine speed (e.g., rpm) and/or vehicle speed (e.g., mph, kmh, etc.). The change in appearance of the lights can provide an enhanced aesthetic appearance and improved vehicle safety.]

BACKGROUND

Brake light systems are necessary for most motor vehicles. Various vehicle safety laws and regulations have been enacted that require certain illumination features for improved safety. Standard 108 of the Federal Motor Vehicle Safety Standard (FMVSS) is one example regulation that specifies requirements for original and replacement lamps and reflective devices. Other laws, regulations and standards may be applicable based on vehicle requirements for local city, state, or country.

Rear running lights are generally identified by a reduced continuous illumination of the vehicles rear brake lights. While such running lights are usually operated at night, the lights may be operated at anytime for safety or aesthetic appearance. Common safety standards require that application of brakes in a motor vehicle results in a solid-bright-red illumination of the brake lights for both for on-road and off-road applications.

The disclosure described herein expands on the principle application of running lights used for vehicle brake light systems to provide an enhanced vehicle brake light system. The described enhancements for vehicle braking may provide improved aesthetic appeal as well as enhanced safety as will be described.

BRIEF DESCRIPTION OF THE DRAWINGS

Non-limiting and non-exhaustive embodiments are described with reference to the following drawings.

DETAILED DESCRIPTION

Figure 1A:
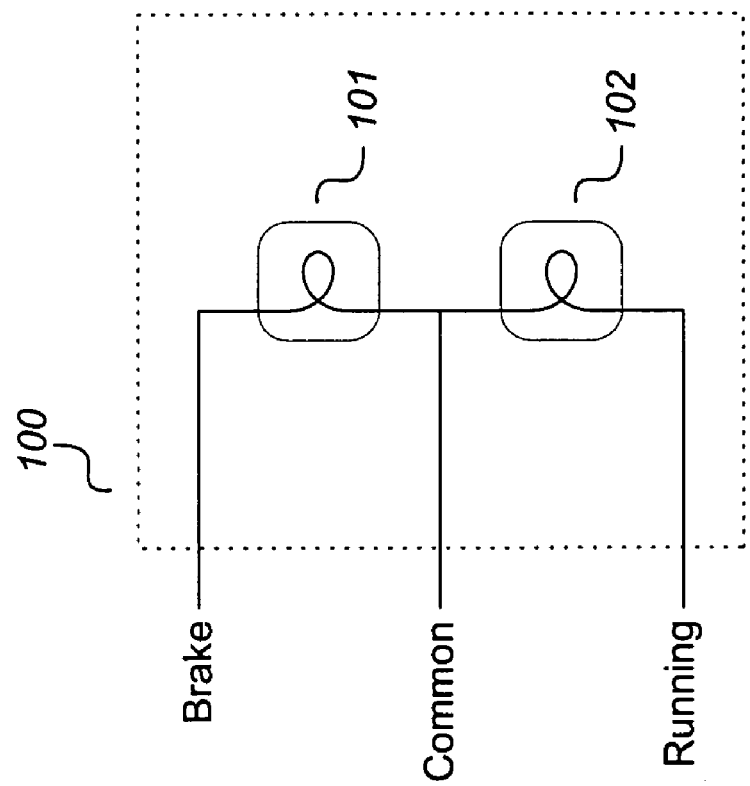
FIG. 1A is a schematic representation of a conventional brake and running light indicator system using lights.

Various embodiments will be described in detail with reference to the drawings, where like reference numerals represent like parts and assemblies throughout the several views. Reference to various embodiments does not limit the scope of the present disclosure, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electro-magnetic, mechanical, logical, or other connection between the items connected, without any electrical, mechanical, logical or other intermediary there between. The term "coupled" can mean a direct connection between items, an indirect connection through one or more intermediaries, or communication between items in a manner that may not constitute a connection. The term "circuit" can mean a single component or a plurality of components, active and/or passive, discrete or integrated, that are coupled together to provide a desired function. The term "signal" can mean at least one current, voltage, charge, data, or other such identifiable quantity.

Briefly stated, the present disclosure generally relates to a system, method and apparatus for modulated control of a vehicle lighting system, which is useful for brake lights and/or running lights in a motor vehicle. Various vehicle operating parameters are monitored to determine an appropriate modulation control mode for the vehicle. In some examples, the engine speed (e.g., in revolutions-per-minute or rpm) or vehicle speed (e.g., in miles-per-hour or mph, kilometer-per-hour or kmh, etc.) is used as a parameter for modulated control of the lighting system. The modulated control scheme is used to control any number of features of the lighting system including illumination color, illumination intensity, selection of sequence illumination pattern, and adjustment of sequence rate. The modulated control scheme may be applied to off-road buggy whip-lights or other aesthetic vehicle lights and safety enhancements. The modulated control scheme may be applicable for off-road and on-road vehicle applications where localized government ordinances permit.

Figure 1B:
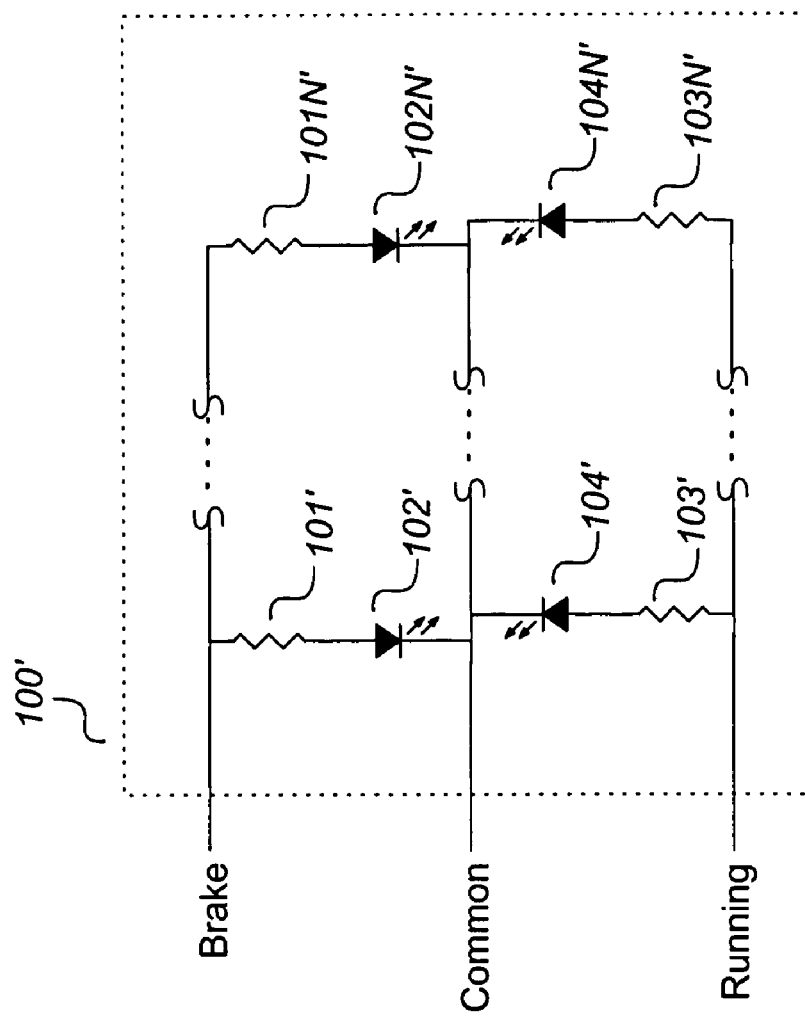
FIG. 1B is a schematic representation of conventional brake and running and brake light indicator systems using LEDs.

FIGS. 1A and 1B show example illustrations of conventional brake and running light systems using lights (100) or LEDs (100'). The brake light systems typically employ at least two illumination sources, a brake illumination source (101) and a tail light illumination source (102). The brake illumination source (101) illuminates during the application of the vehicle brakes, while the tail light illumination source (102) is activated when the vehicles headlights are turned on such as for running lights. Both illumination sources (101/102) may return to a common or ground path terminal and may be individually activated by application of vehicle battery power (e.g. +12V) to either source (brake or running).

Although the running light (102) is typically activated when the vehicle headlights are activated for nighttime operation, they may also be activated at any time for safety or aesthetic purposes. The running light (102) typically operates continuously at reduced luminosity when compared to the activated brake light (101), which has an intentionally high intensity red light level for safety indication of vehicle speed reduction or stopping. A common brake light bulb used in vehicles today is an 1157-type bulb, which includes two filaments represented by filaments 101 and 102 in FIG. 1A. The same dual filament scheme may also be accomplished with two single filament 1156-type bulbs as shown in 100.

FIG. 1B illustrates the currently employed example embodiment of FIG. 1A using LED's or an array of LEDs, which may be configured in a pattern. The size and "point-source" intensity for the brake light may be increased by adding more LEDS where required, either for the running light indicators (104'-104N') or the brake light indicators (102'-102N'). Each LED may be coupled to current limiting circuits, exemplified by resistor circuits 101'-101N' for the brake light LEDs, and resistor circuits 103' through 103N' for the running light LEDs. In the example embodiment, the current limiting or resistive circuits 101'-101N' are coupled from each LED 102'-102N anode respectively to the brake signal source for the brake LEDs. The current limiting/resistive circuits 103'-103N' are coupled from each LED 104'-104N' anode respectively to the running signal source for the running light LEDs. The resistor circuits (101'-101N'/103'-103N') may also be replaced by current sources for more precise control of LED luminosity.

Figure 2:
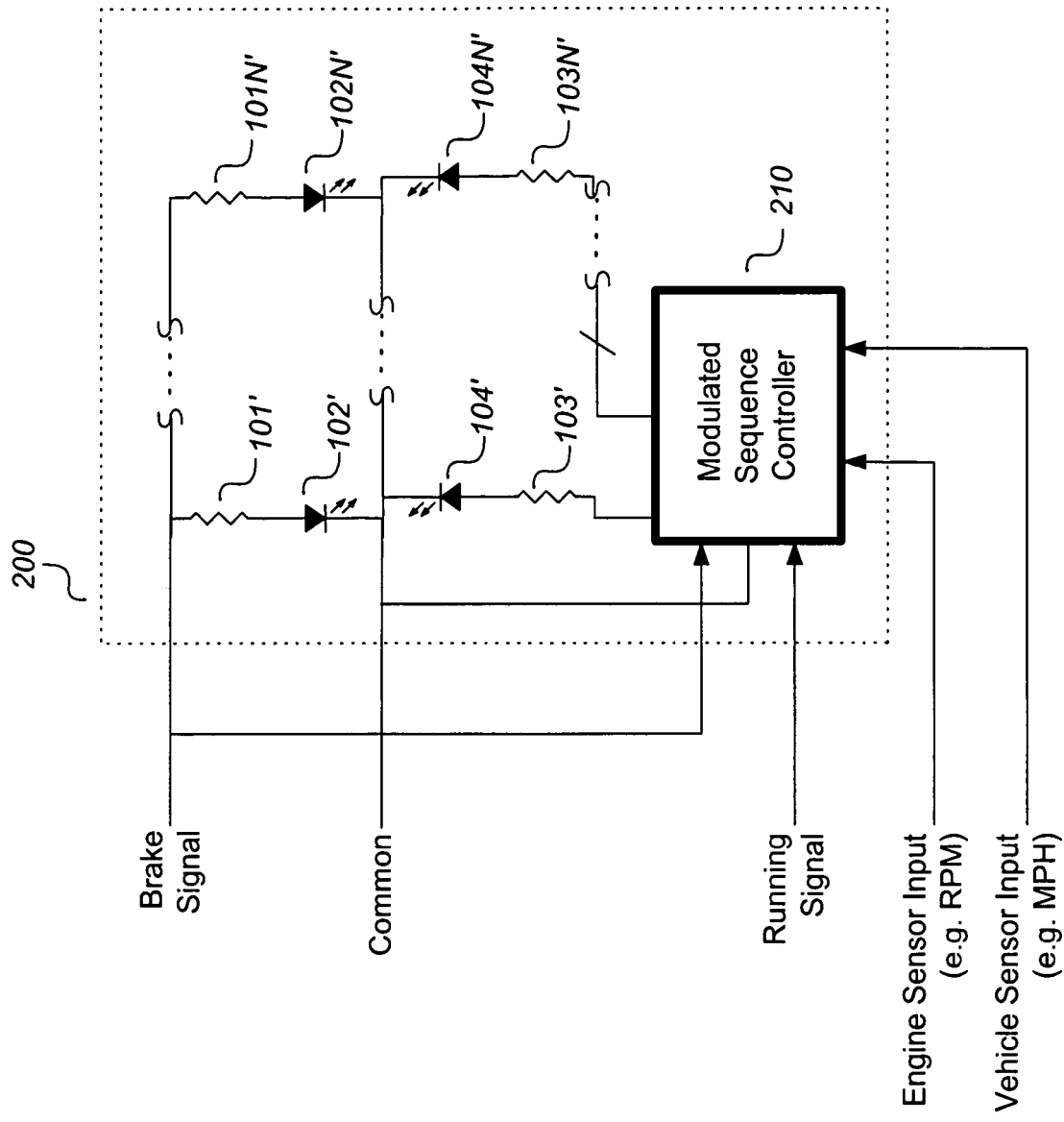
FIG. 2 is a schematic representation of a vehicle safety light system incorporating a modulated sequencer arranged in accordance with the present disclosure.

FIG. 2 illustrates a vehicle safety light system (200), which incorporates a modulated sequencer arranged in accordance with the present disclosure. Vehicle safety light system 200 shows an array of running light LEDs (104'-104N') with their respective anodes coupled via resistor circuits (103'-103N') to a modulated sequencer (210). Modulated sequencer 210 is arranged to selectively control the various LEDs in response to one or more monitored engine or vehicle parameters. The example embodiment is arranged for "high-side" activation, but each LED may equally be arranged for cathode-side or "low-side" activation. In addition to the brake, running, and common terminals for brake light system 200, additional engine and/or vehicle sensor input signals are included. As will be described in further detail, one or more engine and/or vehicle parameters such as engine speed (e.g., in rpm), as determined from a tachometer sensor input, or vehicle speed (e.g., in miles-per-hour or mph, kilometers-per-hour or kmh, etc.), as determined from a speedometer sensor input, can be monitored by the modulated sequencer (210). The various functional and/or physical partitions illustrated by FIG. 2 are merely intended to serve as example functional and/or physical partitions, and the various partitions may be separated or integrated into one or more different physical and or functional partitions.

Figure 3:
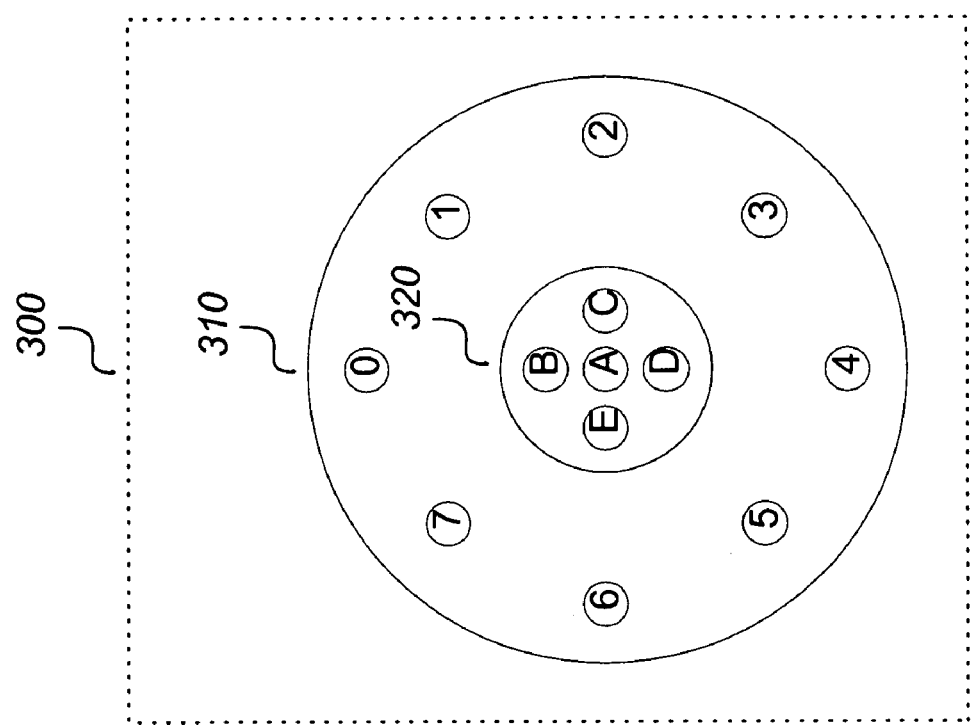
FIG. 3 is a graphical representation of an example vehicle safety light configuration of LEDs or lights for a modulated sequencer arranged in accordance with the present disclosure.

FIG. 3 illustrates an example patterned light configuration (300) of LEDs or lights for a modulated brake light sequencer arranged in accordance with the present disclosure. The patterned light configuration (300) includes an inner LED group (320) arranged concentric with an outer LED group (310). The inner LED group (320) is denoted by LEDs A-E, while the outer LED group (310) is denoted by LEDs 0-7. The inner LED group (320) and outer LED group (310) can be arranged to illuminate solid bright red during the application of the vehicle brakes. When no vehicle brakes are applied, all LEDs are normally inactive or off, except for when the running lights are activated. The inner LED group (320) may or may not be illuminated during running light application depending on the user's aesthetic preference or regulatory requirement.

As part of the unique feature of this invention, the outside concentric LED group (310) may be selectively activated in a sequenced pattern such as in a clockwise or counter clockwise activation/deactivation pattern. The sequenced pattern can be used to create the visual perception of spinning such as might be useful for running light indicators. Other sequencer patterns and LED arrangements are also contemplated. As will be described in further detail, the rate of the spinning or sequenced pattern may be modulated by the engine speed or vehicle speed. As will also be described in further detail, the direction (clockwise/counter clockwise) of the spin or sequenced pattern may be user selected such as by a switch, changed by an engine or vehicle operating parameter (e.g., a derivative sign change of the engine or vehicle speed indicating acceleration or deceleration of the engine), or some other input parameter.

Another unique feature of the present disclosure is that the LEDs can be arranged to provide color differentiation between brake light activation and running light activation. For example, the running light sequence may use green LEDS to indicate spin or sequence pattern, but change to solid-red LEDS when the brakes are applied. The inner LED group (320) may or may not incorporate running light modulation features depending on user preference.

Figure 4:
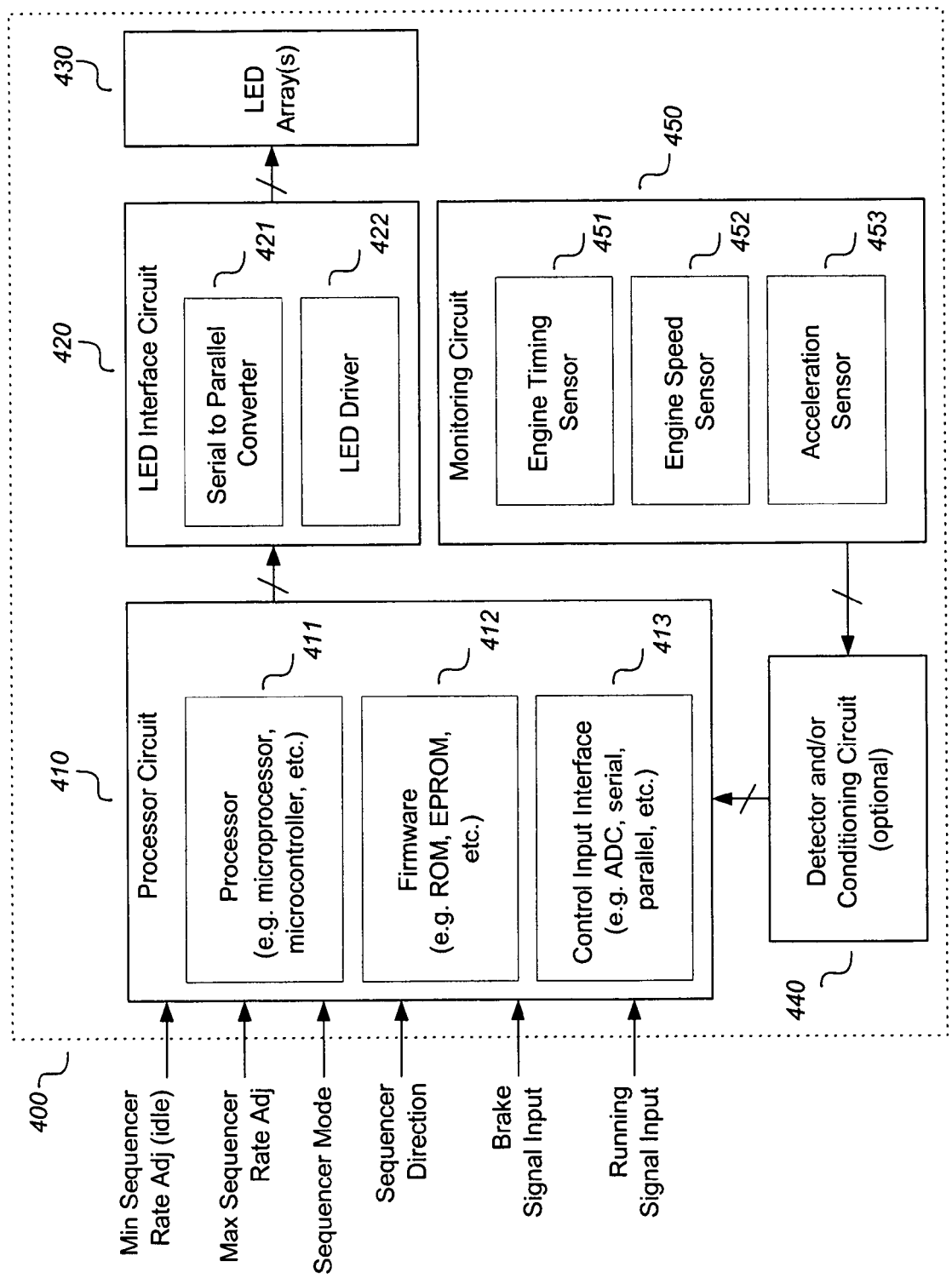
FIG. 4 is a schematic representation of an example modulated sequencer arranged in accordance with the present disclosure.

FIG. 4 illustrates an example modulated sequencer (400) arranged in accordance with the present disclosure. The modulated sequencer 400 includes a processor circuit (410) coupled to an LED circuit (430) via an optional LED interface circuit (420). The processor circuit (410) may be arranged to monitor signals from a monitoring circuit (450) via an optional detector and/or conditioning circuit (440). The processor circuit (410) is arranged to control the drive to the LED circuit (430) in response to a variety of signals such as from sensor based circuits, and/or from various operating parameters that can be selected by default settings or by a user initiated selection. The processor circuit (410) processes the various input signals and determines the appropriate manner in which to activate the LED circuit (430) such that the desired sequence is perceived at the appropriate time. The LED circuit (430) can include a single LED, a series of LEDs or an array of LEDs (430). Moreover, the LED circuit (430) may be arranged to provide a single color, or multiple colors as may be desired.

The processor circuit (410) includes a processor (411) such as, for example, a general purpose microprocessor, a general purpose microcontroller, a digital signal processor, or an application specific integrated circuit (ASIC). In some instances, the process is a discrete part, while in other instances the processor is a core that is integrated into another circuit such as a processor core in a system-on-chip (SOC)

circuit. The processor circuit (410) may include firmware (412) in cooperation with the processor (411) for program and data storage such as stored in read-only memory (ROM), electrically programmable read-only memory (EPROM), electrically erasable programmable read-only memory (EEPROM), flash programmable read-only memory, battery backed random access memory (RAM), or other storage means, etc. The processor circuit (410) may also include a control input interface (413) in cooperation with the processor (411) and/or firmware (412) such as an analog-to-digital converter (ADC), parallel-to-serial converter, timer circuit, or interrupt controller, etc., to provide digital signals to the processor (411) from the sensor input signals.

In some system implementations, the processor circuit may provide output signals that are not in a proper form for direct use by the LED circuit (430). In such a case, the LED interface circuit (420) can be arranged to condition the processor output signal for proper interfacing with the LED circuit (430). In one example, the LED interface circuit is arranged to provide conversion of the signals between a serial data stream and a parallel data stream via a serial to parallel converter interface (421). In another example, the LED interface circuit is arranged as an LED driver circuit (422) to generate current or voltages that are appropriate for the LED circuit (430). The optional detector and/or conditioning circuit (440) can be arranged to receive one or more input signals from the monitoring circuit (450), which may include an engine timing sensor (451), engine speed sensor (452), and/or acceleration sensor (453). The optional detector and/or conditioning circuit (440) may be used to interface monitoring circuit sensor signals to the processor circuit (410). Sensor circuits 451-453 may include an inductive pickup-type sensor, a hall-effect sensor, optical sensor, electro-mechanical sensor, or other sensor means. An engine spark trigger or timing may be sensed at various points throughout the ignition system (discussed later). Vehicle speed may be derived from sensing the rate of rotation of a vehicle wheel, drive shaft, transmission speedometer cable, etc., to name a few. Some input signals to the processor circuit (410) can be provided in response to user input or in response to a user selected setting. In some instances, input signals are automatically changed based on the operation of the engine such as by detecting: engine speed, vehicle speed, acceleration, or the derivative thereof, etc. In other instances, the input signals are provided by a setting selector such as by a look-up table (LUT), switch settings, or some other means for identifying operational settings for the system. In still other instances, the input signals are provided by one or more circuits that condition signals for use by the processor circuit (410). The examples provided herein are illustrative of but a few of the examples that are possible.

In one example system, the processor circuit (410) includes a brake signal input that can be processed to identify vehicle brake application to subsequently activate brake lights. In another example, the processor circuit (410) may include a running signal input that can be used to determinate the operational status of vehicle running lights (or tail lights) such that the running lights can be activated as per the sequencer algorithm firmware. The processor circuit (410) may also include a sequencer direction control input, which may be used to initiate a change in direction for the sequencer. The sequencer direction control input can be responsive to changes in an operating condition associated with the engine and/or vehicle (e.g., a change in speed from accelerating to decelerating as identified by the derivative of the engine speed from a tachometer or vehicle speed from a speedometer), or from some other input source.

Modulated sequencer 400 can be arranged to operate in any number of modes, which can be selected by the sequencer mode control input. The sequencer mode control input can thus be used to change various operational features such as the selected color or colors used by the various lights, a selected sequence pattern, etc. In some examples, adjacent lights such as illustrated by FIG. 3 are activated and/or deactivated in sequential order where the delay or dwell time between activating/deactivating adjacent lights is controlled by sequence control/mode parameters. In other examples, another sequence pattern is used where the light activation/deactivation sequence pattern is arbitrarily defined as either adjacent lights or non-adjacent lights. In still further examples, the sequence is defined by varying the color of any of the lights according to a sequencing pattern. In another example, the sequence is arranged to vary the illumination intensity level according to a pattern.

A minimum sequencer rate adjustment control input and/or a maximum sequencer rate adjustment control input can be used by the processor circuit (410) to change the maximum and minimum rate limits for sequencing the activation and deactivation of lights. In one example, the minimum rate is associated with an idle speed of the engine, while the maximum rate can be associated with a normally expected maximum speed of the engine. In another example, the minimum rate is associated with the vehicle at rest (stopped), while the maximum rate can be associated with a defined MPH (mile-per-hour). In another example, a sequencer rate-algorithm uses a first order linear equation where the minimum-sequencer-rate-adjustment input acts as the "intercept" term for a linear equation, the maximum-sequencer-rate-adjustment input acts as the "gain" term for the linear equation, and either engine speed or vehicle speed is used as the independent input term for the linear equation. In general, the various circuit partitions illustrated by FIG. 4 are merely intended to serve as examples of functional and/or physical partitions, and the various partitions may be separated or integrated into one or more partitions as may be desired.

Figure 5:
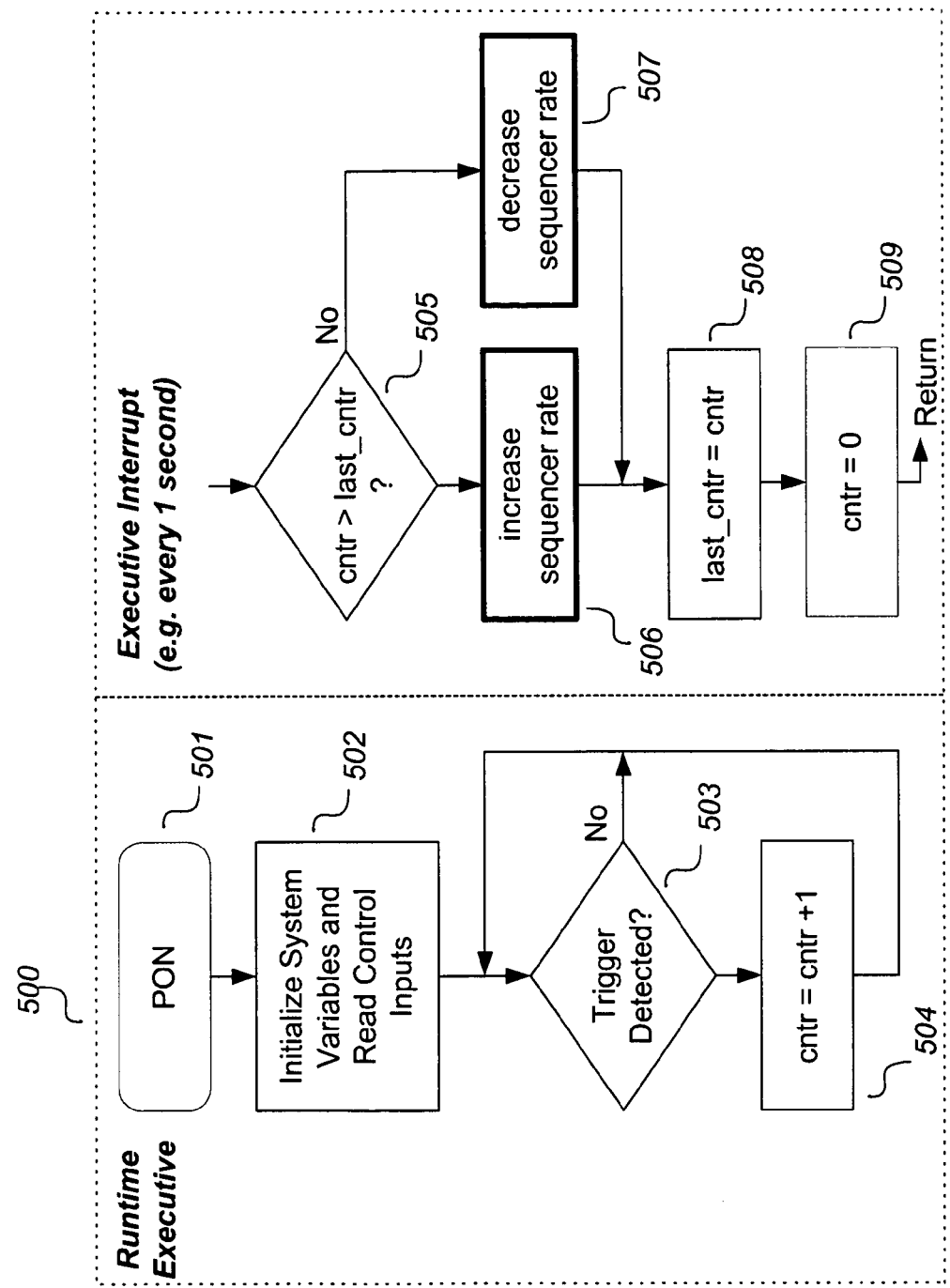
FIG. 5 is a flow chart illustrating an example algorithm for determining an engine's speed in accordance with the present disclosure.

FIG. 5 is a flow chart illustrating an example algorithm (500) for determining an engine's speed such as in rpm (or other trigger event such as may be derived from a vehicle speed sensor) in accordance with the present disclosure. The algorithm (500) may be divided into two runtime operations: a runtime executive illustrated by blocks 501-504 and an executive interrupt illustrated by blocks 505-509.

The runtime executive may be initiated by any means at block 501, such as with a power-on startup routine, or by way of a reset vector. In some examples a multi-threaded system is used where the executive thread is initiated at block 501. At block 502, the runtime executive thread evaluates various control inputs and initializes the system. The control inputs can include a combination of static inputs and dynamic inputs such as user selected input settings, factory selected input settings, and other input types such described previously as min/max sequencer rate, sequencer mode, and direction. Block 502 may also enable the executive interrupt routine. At block 503, the runtime executive is arranged to test for a spark or crank trigger input (or vehicle speed trigger) such as may be provided by sensor 450 from FIG. 4. A counter variable (CNTR) can be incremented at block 504 when a trigger is detected at block 503, where the counter variable (CNTR) indicates a total number of triggers that have been detected. The runtime executive will continue to monitor the trigger at block 503 for additional trigger events.

The executive interrupt routine may be initiated by any means such as on a scheduled interval scheme, or by an event driven scheme. For example, processor circuit 410 from FIG.

4 can be arranged to activate the executive interrupt according to a predetermined time interval such as, for example, once every second. At block 505, the executive interrupt routine evaluates the value of the counter variable (CNTR). Processing continues from block 505 to block 506 when the value of the counter variable (CNTR) exceeds a value of the variable LAST_CNTR (e.g., CNTR>LAST_CNTR), where variable LAST_CNTR corresponds to a value of the counter from the last interrupt cycle. Alternatively, processing continues from block 505 to block 507 when the value of the counter variable (CNTR) fails to exceed the value of the variable LAST_CNTR (e.g., CNTR<LAST_CNTR). At block 506, the sequencer rate is increased, while at block 507 the sequencer rate is decreased. Blocks 506 and 507 may also include additional filtering algorithms to "smooth" perceived sequencer rate changes if desired. Processing then continues from block 506 and 507 to block 508, where the current counter value is stored as the last counter value (LAST_CNTR=CNTR) for the next interrupt cycle. Continuing from block 508 to block 509, the counter value is reset to zero (CNTR=0). The various functional blocks, variables and procedures identified by FIG. 5 are merely intended to serve as an example implementation, and the various functional blocks can be combined, separated, or amended into other arrangements as may be required for any particular implementation.

Figure 6:
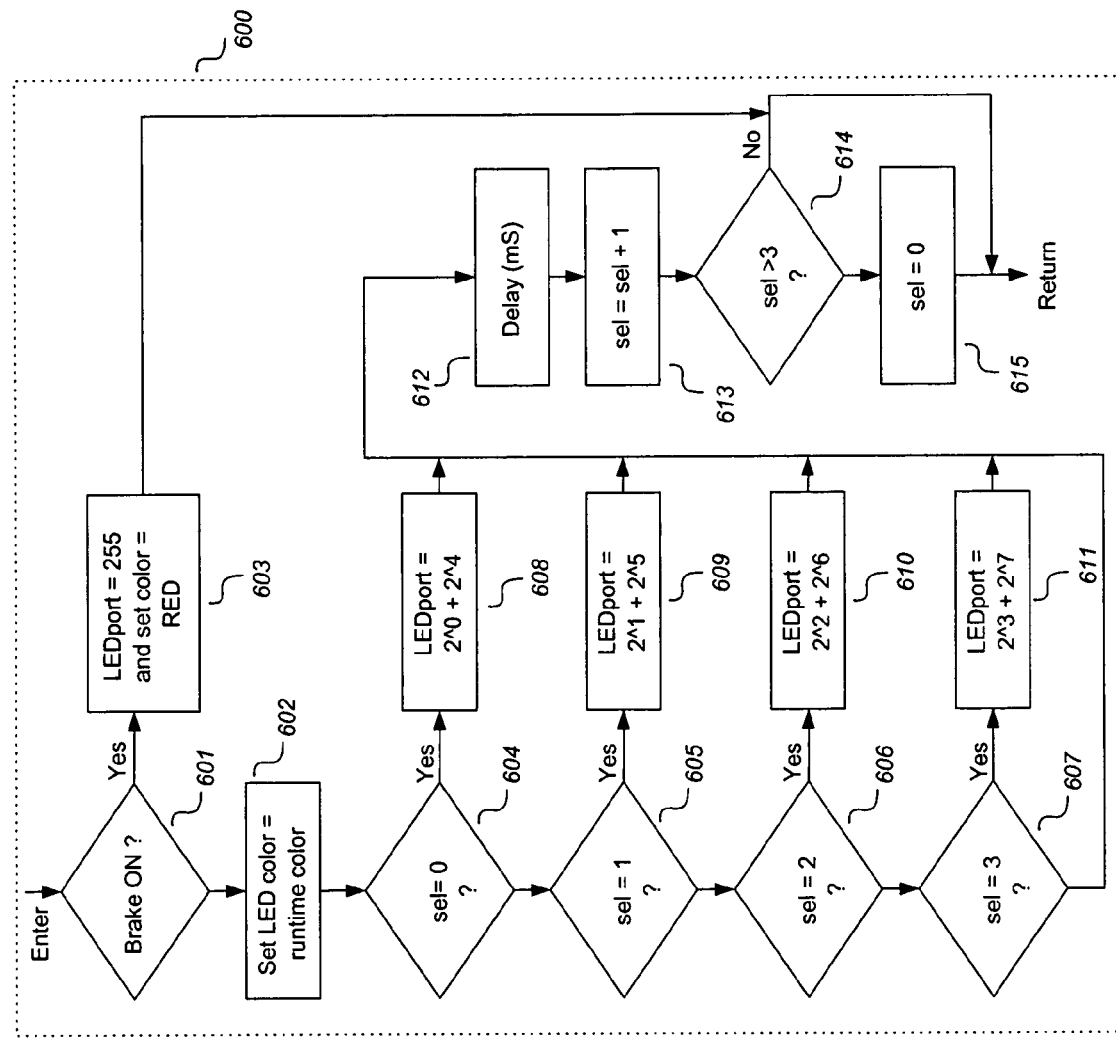
FIG. 6 is a flow chart illustrating an example algorithm for serially sequencing a series of lights or LEDs at a specific rate as determined by the engine speed or vehicle speed in accordance with the present disclosure.

FIG. 6 is a flow chart illustrating an example algorithm (600) for serially sequencing a series of lights or LEDs at a specific rate as determined by the engine speed or vehicle speed in accordance with the present disclosure. The algorithm is illustrated by blocks 601-615 as will be described below.

For the following description, an 8-bit port (LEDport) from a processor circuit (e.g., 410) is used to drive 8 individual LEDs that are arranged in a pattern as illustrated by FIG. 3. Each binary weighted bit from the 8-bit port (LEDport) is arranged to control a single one of the LEDs. The LEDs will be activated two at a time for this example, where the two LEDs are physically oriented 180 degrees apart from one another. For example, the sequence may start by activating the LED ports for LEDs 0 and 4. Then after some time delay, the sequence may continue by deactivating LEDs 0 and 4 and activating the LED ports for LEDs 1 and 5, and so on until the sequence repeats.

Processing begins at block 601, where the system determines if the brake has been applied such as via the brake signal input from FIG. 4. When the sequencer algorithm determines that the brake light need be applied, processing continues to block 603 where the color selected for the brake lights and the running lights is set to red (for color variant systems) and all of the ports are activated for all LEDS (LEDport=255). Alternatively, processing flows from block 601 to block 602 when the sequencer algorithm continues to sequence the runtime lights when the brake has not been applied. The color or colors associated with the runtime lights can be set to a runtime color that can be selected as illustrated by block 602.

Processing continues from block 602 to decision blocks 604-607, which evaluate a value associated with a selector-variable (SEL) for the sequence. When the value associated with the selector-variable (SEL) is equal to zero (SEL=0), processing flows from decision block 604 to block 608, wherein LEDs 0 and 4 are activated by setting LEDport=$2^0$ and $2^4$. When the value associated with the selector-variable (SEL) is equal to one (SEL=1), processing flows from decision block 604 to block 609 via decision block 605, wherein LEDs 1 and 5 are activated by setting LEDport=$2^1$ and $2^5$. When the value associated with the selector-variable (SEL) is equal to two (SEL=2), processing flows from decision block 604 to block 610 via decision blocks 605 and 606, wherein LEDs 2 and 6 are activated by setting LEDport=$2^2$ and $2^6$. When the value associated with the selector-variable (SEL) is equal to three (SEL=3), processing flows from decision block 604 to block 611 via decision block 605, 606 and 607, wherein LEDs 3 and 7 are activated by setting LEDport=$2^3$ and $2^7$. After the various LED ports are activated, processing continues to block 612.

The rate of change between LED port values (or sequencer rate) may be set by a delay function at block 612, where the delay value, denoted as (mS) can be directly correlated to the calculated speed for the engine (e.g., rpm) or vehicle (e.g., mph or kmh). Once the delay time for block 612 has elapsed, the selector variable can be increased in value at block 613. At block 614, the value of the selector variable (SEL) is range tested to determine if the end of the sequence has been reached. When the end of the sequence has been reached, the selector variable is reset to a value of zero (SEL=0) so that the sequence can be repeated.

In some implementations, the direction of the sequence can be reversed by changing blocks 613-615. For example, block 613 can be replaced with another block that decrements values (SEL=SEL-1), the range test at block 614 can be replaced to test the bottom range (SEL<0), and the selector-variable is reset to a maximum value instead of a minimum value (SEL=3) at block 615. The various functional partitions illustrated by the flow chart of FIG. 6 are merely intended to serve as example functional partitions, and the various partitions may be separated or integrated into one or more different functional partitions.

Figure 7:
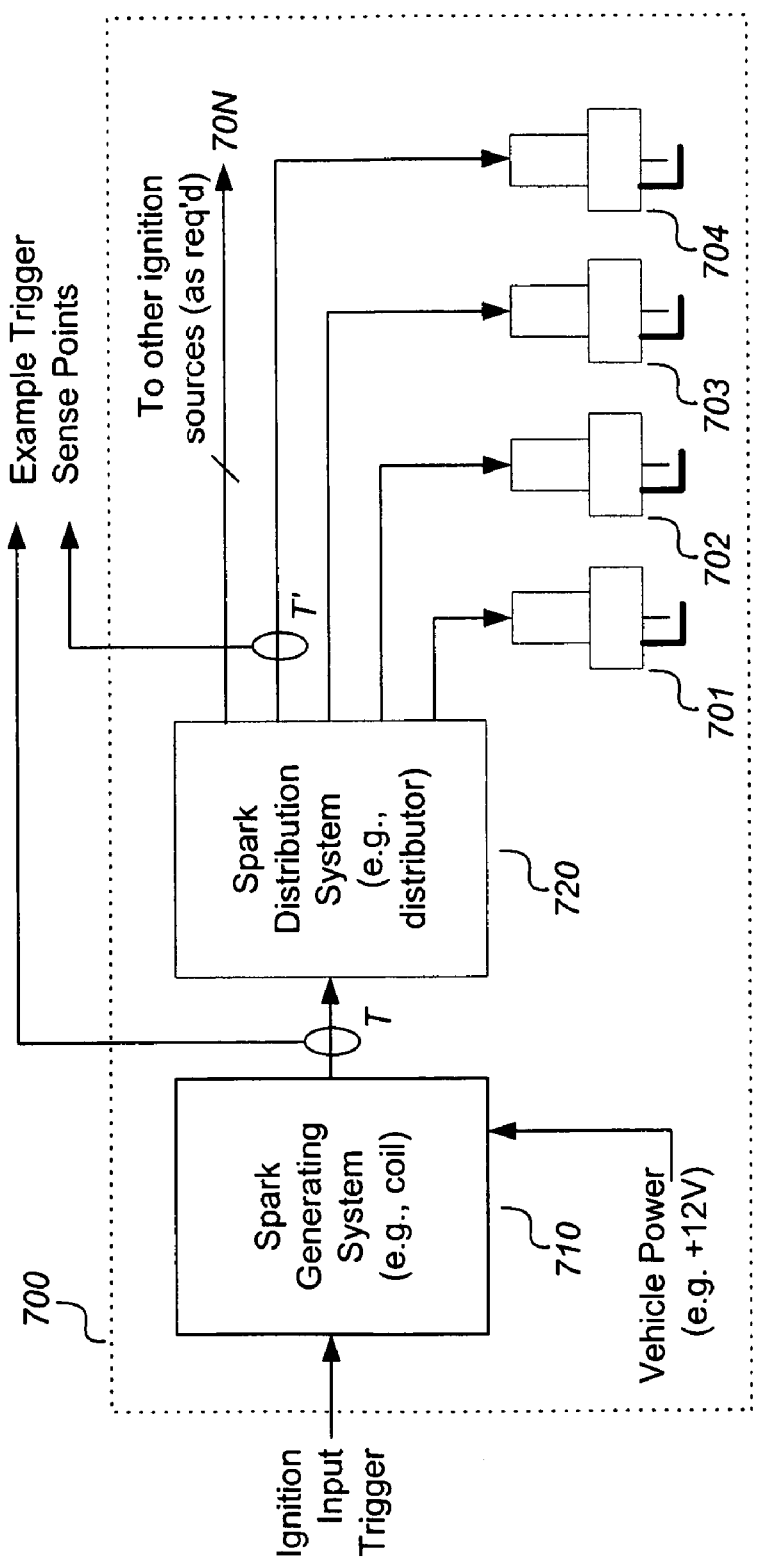
FIG. 7 is a block diagram illustrating an example engine ignition or spark distribution system which may be used as trigger or synchronizing sources for an engine speed modulated vehicle safety light system, arranged in accordance with the present disclosure.

FIG. 7 is a block diagram illustrating an example engine ignition or spark distribution system (700) which includes example trigger sense points that may be used for an engine speed modulated brake light system arranged in accordance with the present disclosure. A typical ignition system for an engine includes a spark generating system (710) that is coupled to a spark distribution system (720). The spark distribution system is coupled to an array of N spark plugs (701 . . . 70N).

The spark generating system is typically a coil that is powered by a vehicle battery with a nominal rating of +12V. The spark generating system is arranged to initiate spark generation by an ignition input trigger such as a vehicles crank trigger (e.g. a Hall-effect sensor, an electronic igniter, a computer, etc.). The output of the spark generating system (710) is typically coupled to the spark distribution system (720), which distributes high-voltage energy to each engine spark plug (701-70N) in the proper synchronized sequence.

In the example embodiment of FIG. 7, a clamp-on type inductive or magnetic pickup is coupled either to the output signal of the spark generating system (710) at point T, or to any spark plug signal from the output of the spark distribution system (720) at point T'. The trigger signal that is provided by the inductive/magnetic pickup may be coupled to an engine speed modulated sequencer tachometer input (See FIG. 4 discussion) for engine speed sensing and processing. One advantage to using a clamp-type inductive/magnetic pickup is the ease of retrofitting the sensor to existing engine spark system wiring. Alternate tachometer trigger sources are possible such as, for example, Hall-effect sensors which can detect the rate of rotation of an engine's crank-shaft (crank trigger). The various functional and/or physical partitions illustrated by FIG. 7 are merely intended to serve as example functional and/or physical partitions, and the various partitions may be separated or integrated into one or more different physical and or functional partitions.

Figure 8:
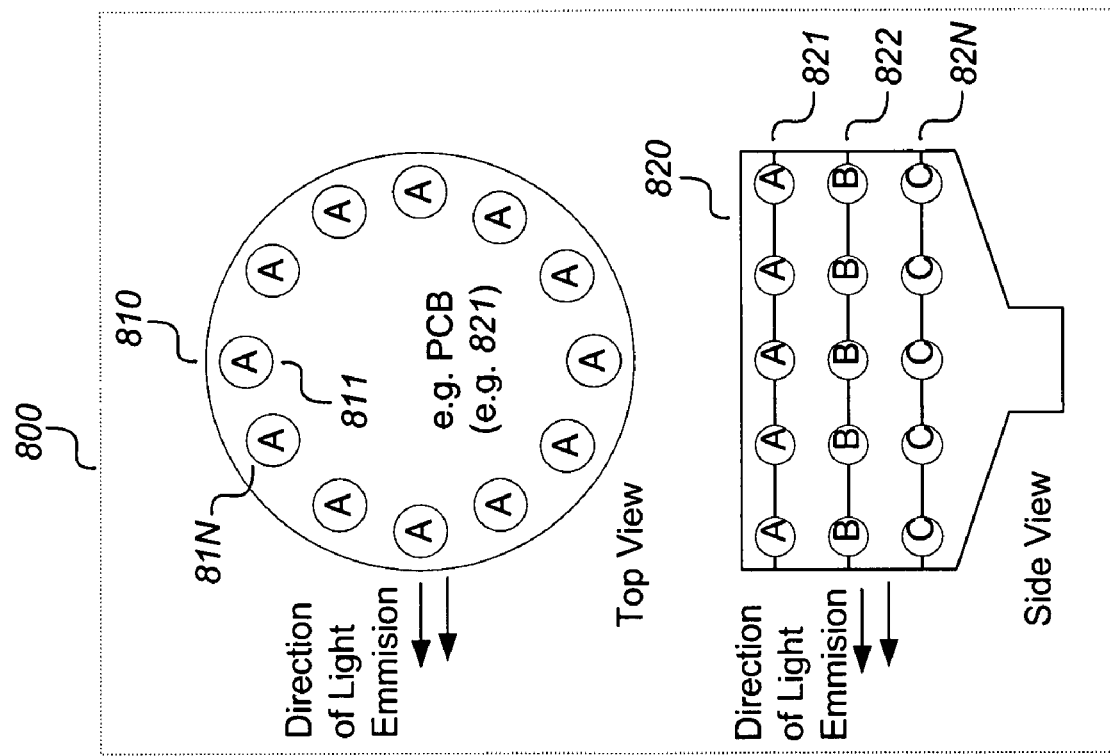
FIG. 8 is a graphical representation of an example light configuration adapted as a whip light for an off-road vehicle, where the lights are arranged for operation with a modulated sequencer arranged in accordance with the present disclosure.

FIG. 8 is a graphical representation of an example light configuration (800) adapted as a whip light for an off-road vehicle, where the lights are arranged for operation with a modulated sequencer arranged in accordance with the present disclosure. Light configuration 800 can be mounted to a whip used for on an off-road vehicle such as a buggy whip light. A buggy whip light can be mounted on top of a fiberglass or other rod, ranging typically between 6 to 8 feet tall, and vertically mounted to the top of the off-road vehicle. The whip-light is arranged such that other vehicles are alerted to the presence of vehicles over small valleys and hills, which may not otherwise be visible.

Whip-light 800 includes a top view (810) and a side view (820). The top view (810) illustrates a circular printed circuit board (PCB) with a plurality of lights or LEDs (811 through 81N) arranged about a central axis in a concentric pattern. The side view (820) illustrates one or more circular PCBs layers (821-82N) stacked on top of each other (LEDs on layers 821-82N are denoted by the letters A, B, and C respectively). The LEDs may be oriented such that light is emitted in the plane of each PCB layer and the direction of light may be oriented to be transmitted perpendicular to the tangent of the PCB edge where the LED is mounted. In this present example embodiment, the modulated sequencer may sequence the LEDs on each PCB layer in a circular pattern. The sequencer direction for each PCB layer may alternate from layer to layer (e.g. the direction for PCB layer 821 is opposite the direction for PCB layer 822, and so on) or sequence the same direction. Any other pattern sequence can be used, including but not limited to flashing patterns, alternating sequences, odd/even sequences, etc. Any shape can be employed by the PCB such that the desired pattern is facilitated. Also, any number of color combinations for the LEDs can be used. It is an advantage of the present disclosure to provide an aesthetic "eye catching" display for a buggy whip-light, which changes based on engine speed or other vehicle parameter.

Figure 9A:
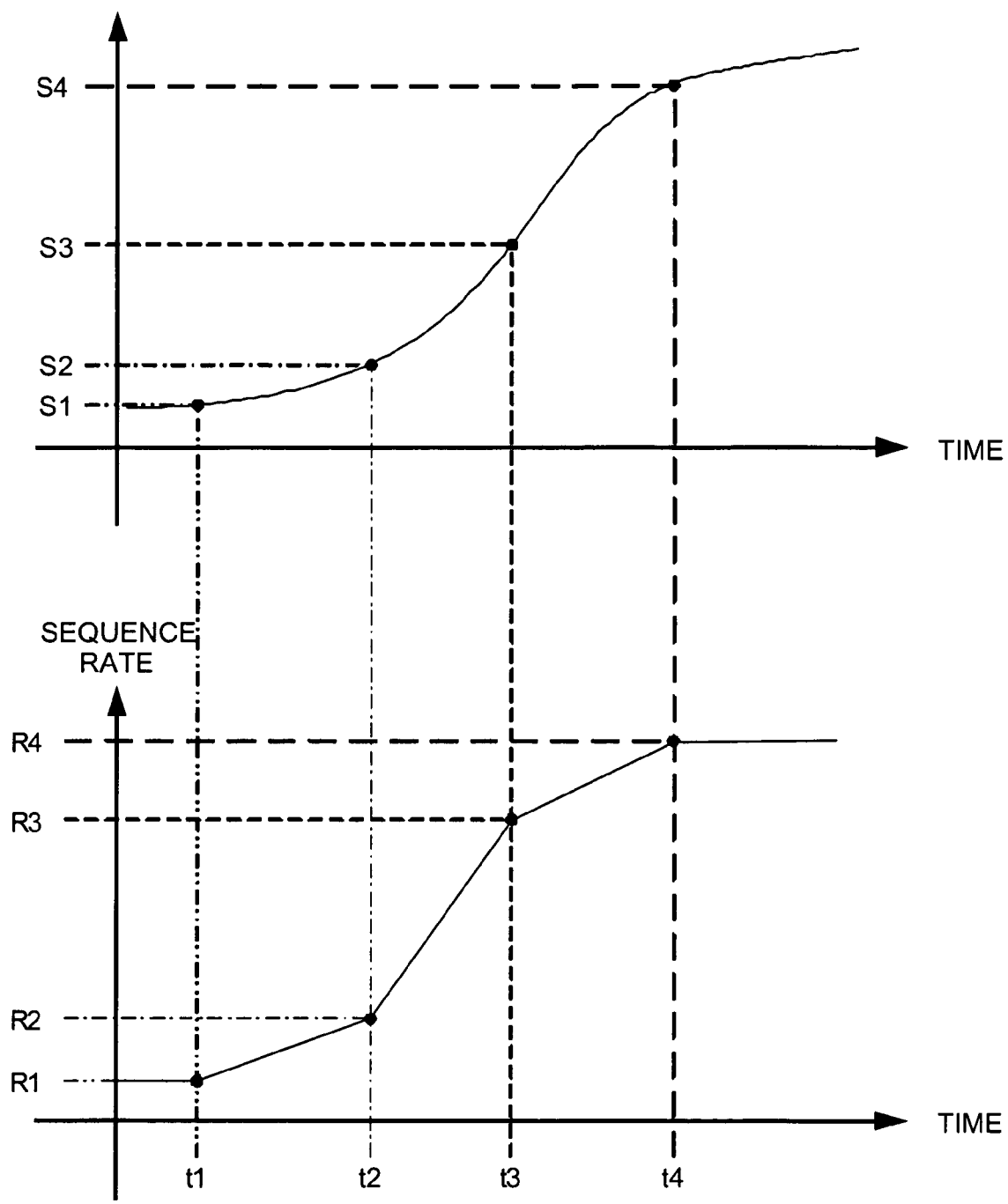
FIGS. 9A and 9B are graphs illustrating the relationship between sequencer rate profiles and vehicle speeds for accelerating and decelerating vehicles.

FIG. 9A is a set of graphs illustrating the relationship between an example vehicle acceleration profile and a corresponding example sequencer rate profile. In this example, the sequencer rate is a dependent variable and the vehicle speed is an independent variable. The graphs of FIG. 9A are composed of two Cartesian coordinate planes.

The top plane of FIG. 9A is an exemplary graph of vehicle acceleration, where the left ordinate represents vehicle speed and the abscissa represents time. The origin is in the lower left corner of the top plane. Axis arrows represent the direction of increasing magnitude for each dimension (i.e., vehicle speed increase points up, time increase points to the right). The solid graph line represents relative vehicle speed and is identified with arbitrary example velocity markers S1-S4, where S1 may represent a minimum considered speed input and S4 may represent a maximum considered speed input.

The bottom plane of FIG. 9A is an exemplary graph of a corresponding sequencer rate, where the left ordinate represents the sequencer rate and the abscissa represents time. The origin of the bottom plane graph is in the lower left corner. Axis arrows represent the direction of increasing magnitude for each dimension (i.e., sequencer rate increase points up, time increase points to the right). The solid graph line in FIG. 9A represents the relative sequencer rate and is identified with rate markers R1-R4, where R1 may represent a minimum sequencer rate and R4 may represent a maximum sequencer rate.

Sequencer rates R1-R4 are aligned in time with velocity markers S1-S4, respectively as illustrated by dashed lines at corresponding times t1-t4. Sequencer rates R1 and R4 may be determined by a manufacturer default preset or user defined (e.g., see FIG. 4 and related discussion). While the transition between sequencer rates (e.g., from R1 to R2, R2 to R3, etc.) is illustrated as straight lines, this is merely one example and the transitions can be designated as linear of non-linear as may be desired.

Figure 9B:
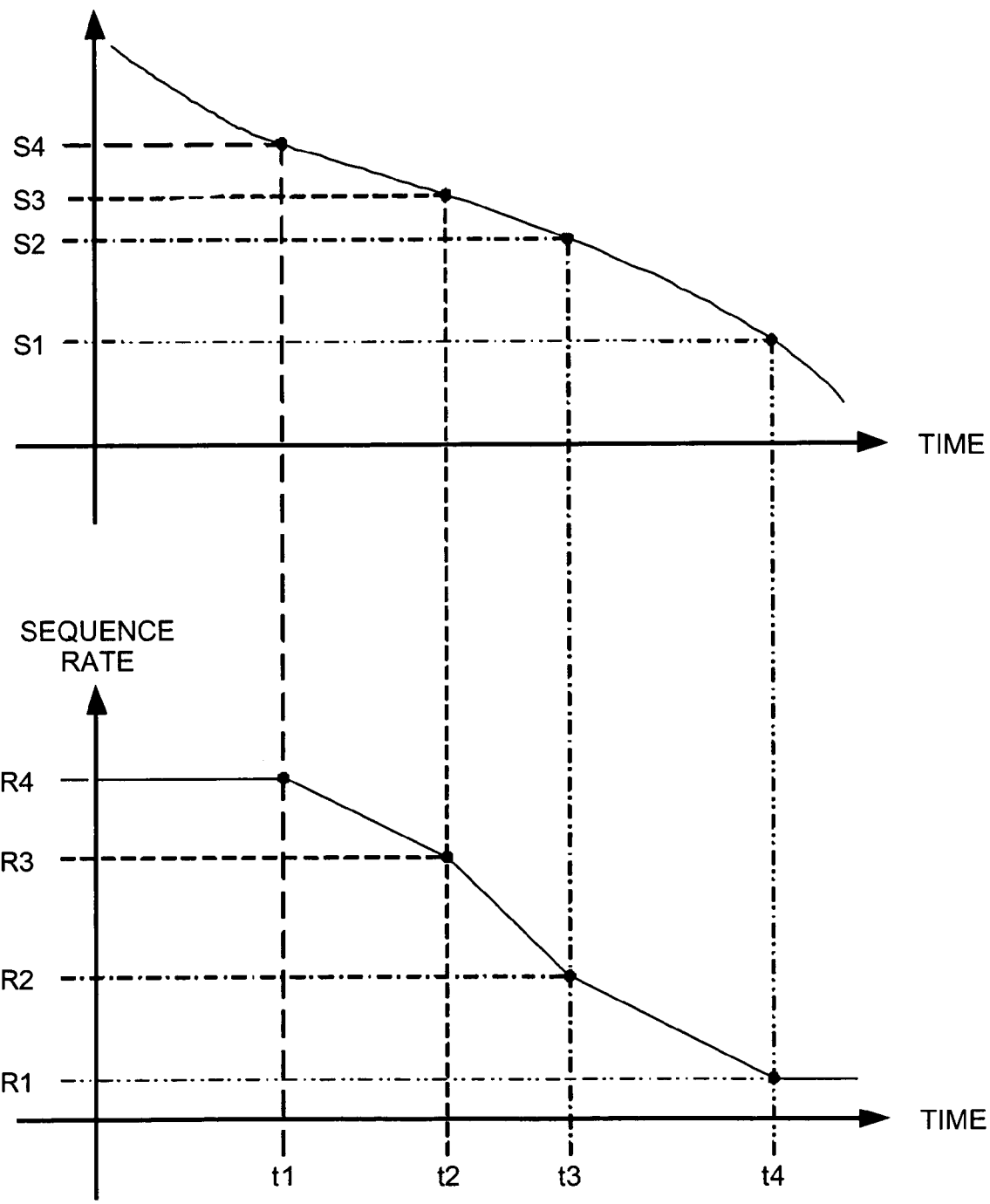

The graphs of FIG. 9B are similar in character to those of FIG. 9A, where FIG. 9B illustrates a decreasing vehicle speed (i.e., deceleration of a negative acceleration) instead of the acceleration profile depicted in FIG. 9A. FIG. 9B demonstrates that the relationship between vehicle speed (and/or acceleration) and sequencer rate for an acceleration profile may be independent of the relationship between vehicle speed (and/or deceleration) and sequencer rate for a deceleration profile. Thus, the sequencer rate profiles for acceleration and deceleration may be different from one another.

Figure 10:
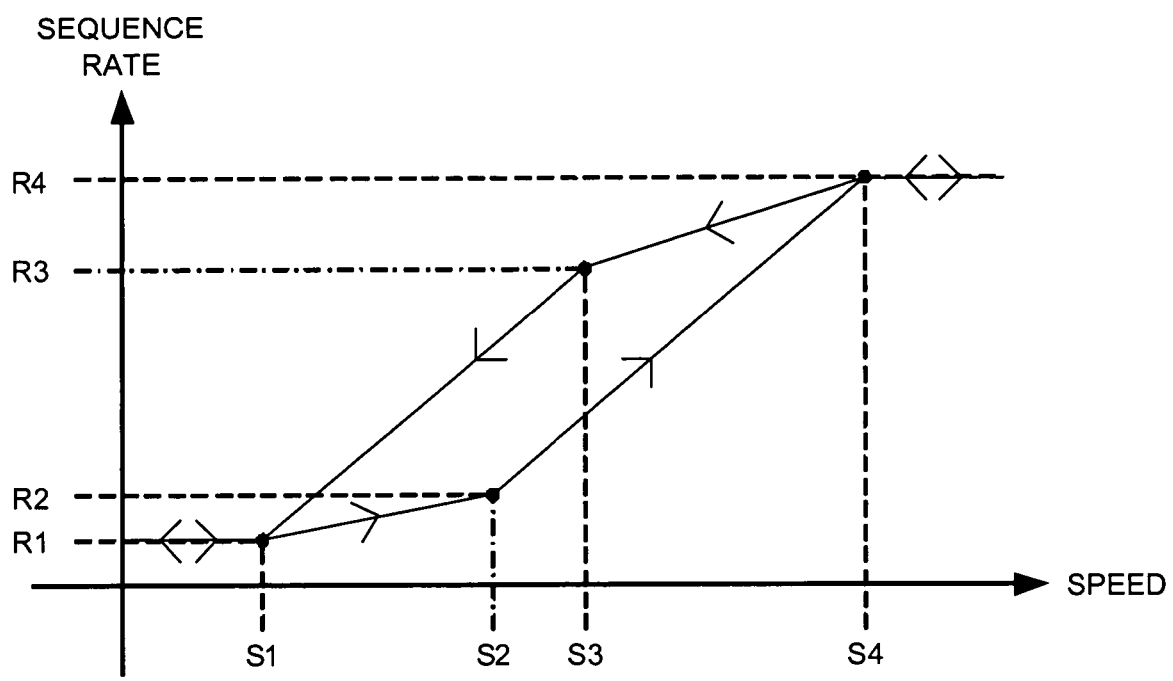
FIG. 10 is a graph illustrating the relationship between vehicle speeds and sequencer rates employing hysteresis.

FIG. 10 is a graph illustrating the relationship between vehicle speeds and sequencer rates employing hysteresis. Hysteresis can be achieved when the sequencer rate profiles for acceleration and deceleration are different from one another. In one example, the sequencer rates of FIG. 9A and FIG. 9B are combined similar to FIG. 10. The exemplary graph has a left ordinate representing the sequencer rate and an abscissa representing vehicle speed. The origin is in the lower left corner of the graph plane. Solid axis arrows represent the direction of increasing quantity for each dimension (i.e., sequencer rate increase points up, vehicle speed increase points to the right). The solid graph line represents relative vehicle speed and is identified with arbitrary example velocity markers S1-S4, where S1 may represent a minimum considered speed input and S4 may represent a maximum considered speed input. Sequencer rate markers are identified by R1-R4, where R1 may represent a minimum sequencer rate and R4 may represent a maximum sequencer rate. R1-R4 correspond directly with the velocity markers S1-S4 respectively and are mutually connected by dashed lines.

Arrows on the solid line pointing in substantially rightward direction represent increasing vehicle speed. Arrows on the solid line graph pointing in a substantially leftwards direction represent decreasing vehicle speed. As shown in this example, a sequence rate increase occurs between speeds S1 and S2 and again between speeds S2 and S4, where the vehicle is accelerating. Also shown, a sequence rate decrease occurs between speeds S4 and S3 and again between speeds S3 and S1, where the vehicle is decelerating. The sequencer rate changes between the various intervals (i.e., the intervals defined by speeds S1-S2, S2-S3, S4-S3, and S3-S1) may be independent of one another, where the interval can be defined linearly or non-linearly between the designated points as may be desired. While FIG. 10 admits of four segments, these are merely examples that may be integrated or separated into one or more segments in other examples.

Figure 11:
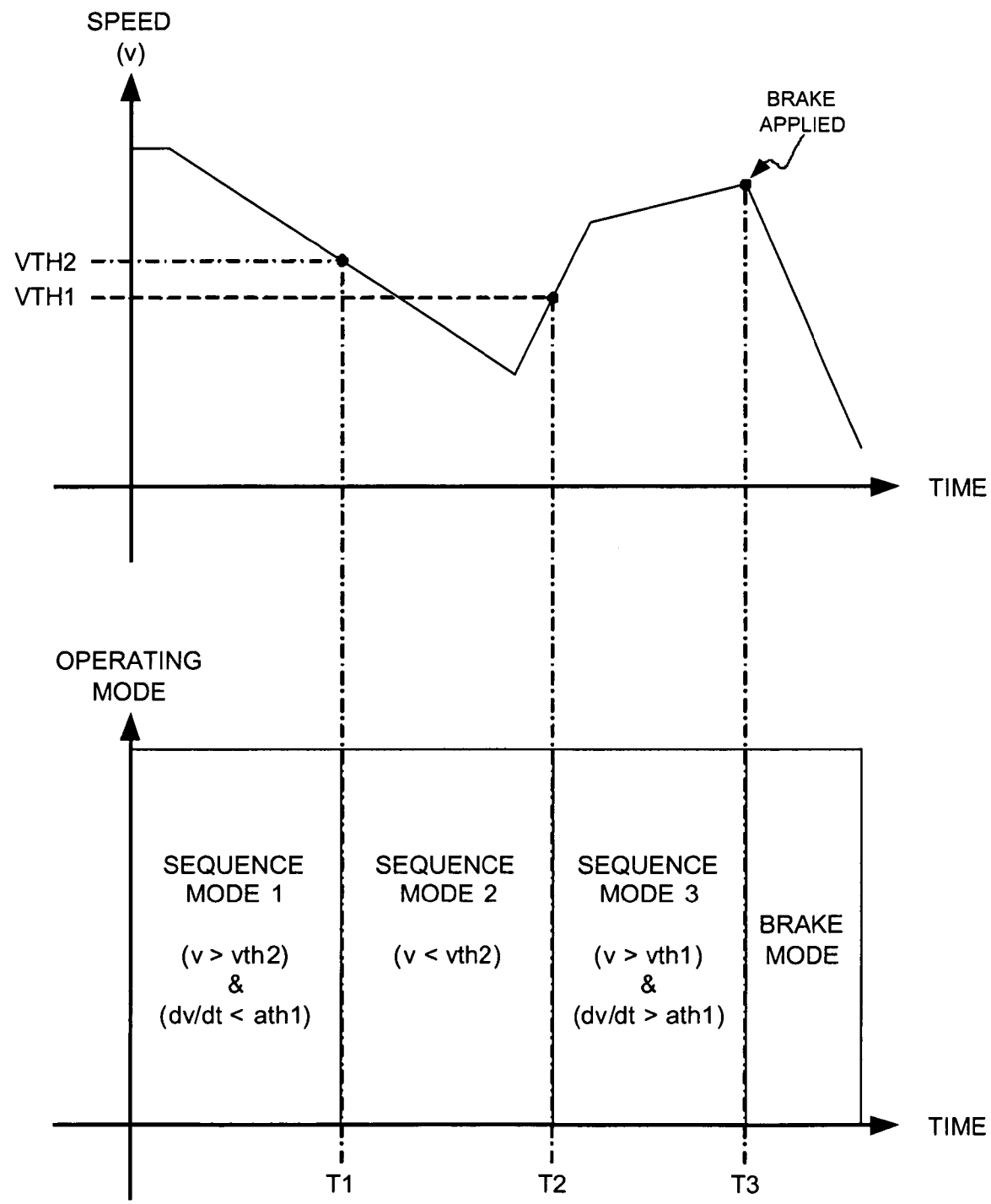
FIG. 11 is a set of graphs illustrating the correlation between sequencer operating modes, velocity, acceleration, and braking.

FIG. 11 is a set of graphs illustrating the correlation between sequencer operating modes, velocity, acceleration, and braking. In this example embodiment, the sequencer mode may change based on the vehicle velocity, which may include a change in sequence direction, emitted color, sequence pattern, or any other desired mode change. Application of the brakes may command the sequencer to execute a "brake mode", such as activating all lights or LEDs for a bright illumination of solid-red.

The graphs of FIG. 11 are composed of two planes. The top plane is an exemplary graph of vehicle acceleration, where the left ordinate represents vehicle speed and the abscissa represents time. The origin is in the lower left corner of the top plane. Axis arrows represent the direction of increasing quantity for each dimension (i.e., vehicle speed increase points up, time increase points to the right). The solid graph line represents relative vehicle speed and is identified with arbitrary example velocity thresholds vth1 and vth2. In addition, any acceleration threshold may also exists such as ath1, ath2, etc., that is considered useful for an anticipated rule-based algorithm (discussed later). The bottom plane is an exemplary graph of corresponding sequencer operating modes, where the left ordinate represents the sequencer operating mode and the abscissa represents time. The origin of the bottom plane graph is in the lower left corner.

FIG. 11 illustrates the mode transitions that occur for a vehicle traveling at speed (or velocity) v. As the vehicles speed (v) and acceleration (which is the derivative of speed, or dv/dt) changes, various thresholds are reached that result in a changed in the operating mode. A first vehicle speed threshold is designated as vth1, while a second vehicle speed threshold is designated as vth2. Also, a vehicle acceleration threshold is designated as ath1.

According to the example vehicle speed profile of FIG. 11, the vehicle speed changes from decelerating at time T1 to accelerating at time T2, and then the brake is applied at time T3. MODE 1 for the sequencer is active when the vehicle is decelerating at a rate that is less than ath1 when the vehicle speed is greater than vth2. When the vehicle speed drops below threshold vth2 at time T1, the sequencer changes from MODE1 to MODE2. While in MODE2, the vehicle begins to accelerate at a rate that exceeds ath2. When the speed of the vehicle exceeds the first speed threshold (vth1) the sequencer mode changes from MODE 2 to MODE3. At time T3, a brake is applied by the vehicle operator and the mode changes from MODE 3 to the braking mode. The example described above can be illustrated below:

RULE1: IF (v>vth2) & (dv/dt<ath1) THEN mode=MODE1
RULE2: IF (v<vth2) THEN mode=MODE2
RULE3: IF (v>vth2) & (dv/dt>ath1) THEN mode=MODE3
RULE4: IF (brake applied) THEN mode=MODE4 or brake mode Sequencer Operating Mode Rules 1-4 are merely an example and may include any number of modes and/or rules for application to a vehicle safety light system as desired according to the present disclosure. It is evident from the current disclosure that the sequencer modes may be modulated by engine parameters in addition to the vehicle speed.

Figure 12:
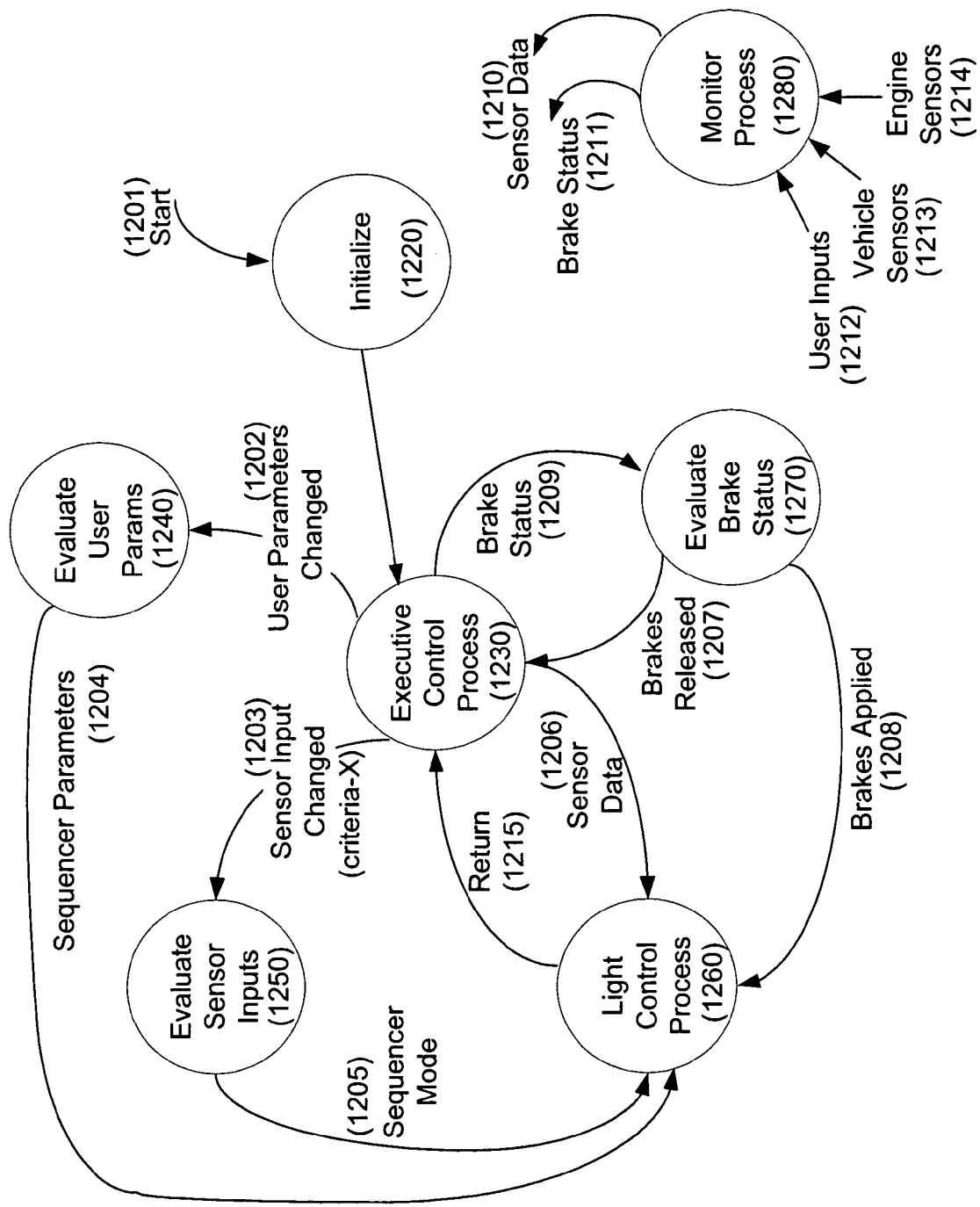
FIG. 12 is a state diagram illustrating an example of various operating states for a modulated vehicle safety light system according to the present disclosure.

FIG. 12 is a state diagram illustrating various processing states for a modulated vehicle safety light system that is arranged according to the present disclosure. The state diagram in FIG. 12 shows seven processes including: initialization (1220), executive control (1230), evaluating user parameters (1240), evaluating sensor inputs (1250) a light control process (1260), evaluating the braking system status (1270), and a monitor process (1280).

The initialize state (1220) is entered from Start (1201), which may represent a system power-on event, a user initiated event, a sensor initiated event, or any other desired event. The initialize state (1220) may include functions to allow system execution such as firmware boot-up, turning on peripherals, clearing data registers, executing self tests, reading initial user settings such as sequencer min/max rate/direction/mode, or any other initialization procedure desired or required. Once the system is initialized, the system proceeds to the executive control process (1230), which is the runtime state machine control. The executive control process (1230) continuously evaluates sensor data (1210) and brakes status (1211) and determines the next appropriate state to execute based on the evaluation. The sensor data (1210) and brake status (1211) is derived from the monitor process (1280), which may be executed autonomously or asynchronously from the executive control process (1230). The monitor process (1280) continuously monitors user inputs (1212), vehicle sensors (1213), and/or engine sensors (1214), and communicates processed sensor/input data to the executive control process (1230) for runtime evaluation.

The executive control process (1230) is arranged to communicate sensor data (1206) to the light control process (1260), which updates the vehicle safety light/LED array based on the current sequencer parameters (1204), the current sequencer mode (1205), and the current sensor data (1206). After the light control process (1260) completes processing its various inputs, processing returns (1215) to the executive control process (1230).

When a user parameter change (1202) occurs, the executive control process (1230) activates the evaluate user parameters (1240) process, which updates various sequencer parameters (1204) that are used by the light control process (1260) for subsequent light/LED array updating. Sequencer parameters (1204) may include data or datum as described for FIG. 4 such as maximum/minimum sequencer rate, sequencer direction, sequencer mode, etc.

In some implementations, sensor inputs such as the vehicle sensors (1213) and engine sensors (1214) are continually evaluated by the monitor process (1280) independent of the executive control process (1230). As such, the resulting sensor data (1210) and brake status (1211) can be generated in an ongoing basis that is also independent of the executive control process (1230). The executive control process (1230) is arranged to continually evaluate the brake status (1211) and the sensor data (1210), and initiate any necessary processes based on their evaluation.

In some instances, the executive control process (1230) determines that a sensor input change (1203) has occurred based on the evaluated sensor data (1210). The evaluate sensor inputs process (1250) then evaluates the sensor inputs that change to determine if the current sequencer mode is still appropriate. A change in the sensor inputs can be determined to require a new operating mode when a rule set or some other condition (e.g., Criteria-X) is satisfied such as by evaluating the sensor data (1210). An appropriate sequencer mode (1205) is identified by the evaluate sensor inputs process (1250) and subsequently utilized by the light control process (1260) for updating the light/LED array as previously described.

The executive control process (1230) also continuously monitors the vehicle brake status data/datum (1209) via the evaluate brake status process (1270). The evaluate brake status process (1270) determines whether or not the brakes have been applied or released. When brakes are applied, the evaluate brake status process (1270) is arranged to provide a brake applied indicator (1208) to the light control process (1260) so that the light control process (1260) can take appropriate action. In some examples, the light control process (1260) is arranged to activate all lights or LEDs with a solid-red color for the safety light system. The lights/LEDs can include the normal brake lights, running lights, or any other vehicle safety lights that are desired to indicate braking. When the brakes are released, the evaluate brake status process (1270) returns a brake released (1207) indicator to the executive control process (1230).

The executive control process (1230) can be arranged to coordinate a series of evaluation processes for evaluating user parameters, sensor inputs, and brake status. The evaluation processes can be implemented as separate processes (e.g., processes 1240, 1250, 1270, etc.) or their functions can be combined into a single process. When multiple processes are used, each evaluation process can be a separate process thread in a multi-threaded environment, or as separate subroutine calls that are called by the executive control process. In some examples, each evaluation process may be activated by a different interrupt such as may be provided by an interrupt controller. Each process can be implemented entirely in hardware, entirely in software, or as a mix of hardware and software. Once the various evaluation processes have completed their functions, control parameters (or control signals) are generated for use by the light control process (1260).

The light control process (1260) is arranged to evaluate the various control parameters/signals including sequencer parameters (1204), sequencer mode (1205) and the sensor data (1206) to generate the appropriate control for the lights and/or LED array(s). The light control process also includes facility to activate the brake mode when the brakes applied indicator (1208) is asserted. The light control process (1260) can also operate independent from the executive control process (e.g., as a process thread, or as a separate hardware/software component) or it can be integrated into the executive control process. In one example, the light control process (1260) is an electronic circuit that is arranged to control light sequencing based on the various controls/parameters. In another example, the sequencer parameters and sequencer mode controls are stored in a register that is accessed by the light control process (1260).

The presently described system, apparatus, and methods take advantage of the sensor data collected from the motion of the motor vehicle and/or the operating conditions of the engine in the motor vehicle to provide control of the lights in the vehicle safety system such as brake lights and/or running lights. Although the preceding description describes various embodiments of the system, the invention is not limited to such embodiments, but rather covers all modifications, alternatives, and equivalents that fall within the spirit and scope of the invention. For example, the positioning of the various components may be varied, the functions of multiple components can be combined, individual components may be separated into different components, or components can be substituted as understood in the art. Since many embodiments of the invention can be made without departing from the spirit and scope of the invention, the invention is not limited except as by the appended claims.

What is claimed is:

1. An apparatus for providing sequence modulated control of an LED array in running tail lights, in a motor vehicle, wherein the motor vehicle includes a braking system and an engine that is wired to an ignition system through an ignition wire, wherein the motor vehicle travels with a vehicle speed and a vehicle acceleration when in operation, wherein the engine rotates with a rotational speed and a rotational acceleration when in operation, and wherein the ignition system controls the firing of the engine when in operation, the apparatus comprising:
   an LED interface circuit that is arranged to sequentially selectively activate each LED from the LED array, wherein a rate of activation is varied in response to a LED control signal;
   a motor vehicle monitoring circuit that is arranged to provide a sensor input signal responsive to changes in either an engine operating condition, a vehicle operating condition, or a combination of the engine operating condition and the vehicle operating condition, wherein the motor vehicle monitoring circuit is operated independent of the braking system; and
   a processor circuit that is arranged to provide the LED control signal responsive to changes in the sensor input signal, wherein the processor circuit is arranged such that the LED array is controlled according to a first sequence when the operating conditions associated with the engine correspond to a non-braking mode, and the LED array is controlled according to a second sequence when the operating conditions associated with the engine correspond to a braking mode, wherein the rate of activation associated with the first sequence is independently controllable with respect to the rate of activation associated with the second sequence, and wherein the rate of activation associated with the first sequence is continuously adjusted irrespective of vehicle motion.

2. The apparatus of claim 1, wherein the motor vehicle monitoring circuit is responsive to changes in the engine operating condition, wherein the engine operation condition corresponds to either a rotational speed associated with the engine, a rotational acceleration associated with the engine, a firing associated with the engine, or any combination thereof.

3. The apparatus of claim 1, wherein the motor vehicle monitoring circuit is responsive to changes in the vehicle operating condition, wherein the vehicle operation condition corresponds to either the vehicle speed, the vehicle acceleration, or any combination thereof, wherein the vehicle speed and vehicle acceleration are inferred from the vehicle operating condition irrespective of vehicle motion.

4. The apparatus of claim 1, the LED interface circuit comprising a serial-to-parallel interface circuit that is arranged to generate a separate drive signal for each LED in the LED array in response to the LED control signal.

5. The apparatus of claim 1, the LED interface circuit comprising an LED driver circuit that is arranged to provide driving signals to the LED array in response to the LED control signal.

6. The apparatus of claim 1, the motor vehicle monitoring circuit comprising a spark trigger sensor that is arranged to sense an ignition timing associated with the engine.

7. The apparatus of claim 6, the spark trigger sensor comprising an inductive sensor that is arranged for coupling to an ignition wire associated with the engine.

8. The apparatus of claim 6, the spark trigger sensor comprising a magnetic sensor that is arranged for coupling to an ignition wire associated with the engine.

9. The apparatus of claim 6, the spark trigger sensor comprising a pickup that is arranged for coupling to an output of a spark distribution system associated with the engine.

10. The apparatus of claim 1, the motor vehicle monitoring circuit comprising a speed sensor that is arranged to sense a rotational speed associated with the engine.

11. The apparatus of claim 1, the motor vehicle monitoring circuit comprising a speed sensor that is arranged to sense a crank shaft speed associated with the engine.

12. The apparatus of claim 1, the motor vehicle monitoring circuit comprising either an inductive coupling sensor, a magnetic coupling sensor, an optical sensor, a electro-mechanical sensor, or a hall-effect sensor that is arranged for monitoring the operating conditions associated with the engine during operation.

13. The apparatus of claim 1, the motor vehicle monitoring circuit comprising a hall-effect sensor that is arranged for generating pulse signals indicative of engine position during operation.

14. The apparatus of claim 1, the motor vehicle monitoring circuit comprising a hall-effect sensor that is arranged for generating pulse signals indicative of an engine crank shaft speed associated with the engine during operation.

15. The apparatus of claim 1, the processor circuit comprising either a general purpose microprocessor, a general purpose microcontroller, a general purpose digital signal processor, or an application specific integrated circuit.

16. The apparatus of claim 1, the processor circuit comprising either a discrete processor or a processor core.

17. The apparatus of claim 1, the processor circuit comprising a control input interface and a processor that are arranged in cooperation with one another, wherein the control input interface is arranged to receive the sensor input signal to provide a digital input signal to the processor.

18. The apparatus of claim 17, the control input interface comprising either an analog-to-digital converter, a serial-to-parallel converter, a parallel-to-serial converter, a timer circuit, an interrupt controller circuit, or any combination thereof 19. The apparatus of claim 1, the processor circuit comprising a processor and a firmware that are arranged in cooperation with one another, wherein the firmware includes computer readable instructions for execution by the processor during operation.

20. The apparatus of claim 19, the firmware comprising either a read-only memory, a programmable read-only memory, an electrically programmable read-only memory, an electrically erasable programmable read-only memory, a static read-only memory, a battery backed up random access memory, and a flash programmable read-only memory.

21. The apparatus of claim 19, the firmware comprising a process for identifying when an acceleration of the engine is identified by the sensor input signal.

22. The apparatus of claim 19, the firmware comprising a process for identifying when a deceleration of the engine is identified by the sensor input signal.

23. The apparatus of claim 19, the firmware comprising a process for identifying when an increase in vehicle speed is detected with the sensor input signal.

24. The apparatus of claim 19, the firmware comprising a process for identifying when a decrease in vehicle speed is detected with the sensor input signal.

25. The apparatus of claim 19, wherein the firmware is arranged to provide a runtime executive process and an executive interrupt process.

26. The apparatus of claim 25, wherein the runtime executive processes is arranged to detect a trigger associated with the sensor input signal.

27. The apparatus of claim 26, wherein the executive interrupt processes is arranged to either increase or decrease a rate associated with the first sequence in response to the detected trigger.

28. The apparatus of claim 26, wherein the executive interrupt processes is arranged to either increase or decrease a rate associated with the second sequence in response to the detected trigger.

29. The apparatus of claim 1, further comprising a housing that is arranged to house the LED array such that the LED array is visible as an off-road whip light.

30. The apparatus of claim 1, wherein at least one of the processor circuit and the LED interface circuit is arranged such that the first sequence is an intensity modulation sequence where the illumination level associated with each LED in the array varies according to the first sequence.

31. The apparatus of claim 1, wherein at least one of the processor circuit and the LED interface circuit is arranged such that the first sequence is a patterned activation sequence where the activation of each arbitrary LED in the array varies according to the first sequence.

32. The apparatus of claim 1, wherein at least one of the processor circuit and the LED interface circuit is arranged such that the first sequence is a patterned color sequence where the activation of each LED in the array has a color attribute that varies according to the first sequence.

33. A method for providing sequence modulated control of an LED array in running tail lights, in a motor vehicle, wherein the motor vehicle includes a braking system and an engine that is wired to an ignition system through an ignition wire, wherein the motor vehicle travels with a vehicle speed and a vehicle acceleration when in operation, wherein the engine rotates with a rotational speed and a rotational acceleration when in operation, and wherein the ignition system controls the firing of the engine when in operation, the method comprising:

evaluating sensor inputs when the motor vehicle is in operation, wherein the sensor input signals are associated with either an engine operating condition, a vehicle operating condition, or a combination of the engine operating condition and the vehicle operating condition;

evaluating a brake status associated with the braking system for the motor vehicle, wherein the brake status corresponds to either brake applied condition or brake released condition for the brake system;

selecting an operating mode as a brake mode when the brake status corresponds to the brake applied condition;

selecting the operating mode as a non-brake mode when the brake status corresponds to the brake released condition;

generating sensor data responsive to the evaluated sensor inputs;

adjusting at least one control of the LED array according to a first sequence that is responsive to the sensor data when the non-brake mode is selected, wherein a rate of activation associated with the first sequence is continuously adjusted irrespective of vehicle motion; and adjusting at least one control to the LED array according to a second sequence when the braking mode is selected, wherein a rate of activation associated with the second sequence is independently controllable with respect to the rate of activation associated with the first sequence.

34. The method of claim 33, wherein the sensor data is generated by a monitoring process responsive to changes in the engine operating condition, wherein the engine operation condition corresponds to either a rotational speed associated with the engine, a rotational acceleration associated with the engine, a firing associated with the engine, or any combination thereof.

35. The method of claim 33, wherein the sensor data is generated by a monitoring process responsive to changes in the vehicle operating condition, wherein the vehicle operation condition corresponds to either the vehicle speed, the vehicle acceleration, or any combination thereof, wherein the vehicle speed and vehicle acceleration are inferred from the vehicle operating condition irrespective of vehicle motion.

36. The method of claim 33, further comprising evaluating user parameters to generate sequence parameters for the first sequence, wherein the sequence parameters correspond to at least one of: maximum sequencer rate, minimum sequencer rate, sequencer direction, and sequencer mode.

37. The method of claim 33, wherein the first sequence corresponds to a sequence where adjacent lights in the LED array are activated in succession to one another with a dwell time between each adjacent activation that is varied in response to the sensor data.

38. The method of claim 33, wherein the first sequence corresponds to a sequence where adjacent lights in the LED array are deactivated in succession to one another with a dwell time between each adjacent activation that is varied in response to the sensor data.

39. The method of claim 33, wherein the first sequence corresponds to a sequence where each LED in the LED array has a corresponding position in the first sequence such that LEDs are activated according to their corresponding position in succession to one another, wherein the corresponding position of adjacent LEDs in the array are either adjacent to one another in the first sequence or non-adjacent to one another in the first sequence.

40. The method of claim 33, wherein the first sequence corresponds to a sequence of colors, wherein a color is assigned to each LED in the array that varies in response to the sensor data.

41. The method of claim 33, wherein the first sequence corresponds to a sequence of illumination levels, wherein an illumination level is assigned to each LED in the array that varies in response to the sensor data.

42. The method of claim 33, wherein the second sequence corresponds to a sequence where a portion of the LEDs in the array are activated with a continuous illumination when the brake mode is selected.

43. The method of claim 33, wherein the second sequence corresponds to a sequence where all of the LEDs in the array are activated with a continuous illumination when the brake mode is selected.

44. The method of claim 33, further comprising initializing at least one of user parameters and the selected operating mode during a start-up procedure.

45. The method of claim 33, further comprising: configuring the first sequence such that either the activation of the LEDs, the deactivation of the LEDs, or both the activation and deactivation of the LEDs are arranged to provide a visually distinctive pattern when the non-braking mode is selected.

46. The method of claim 33, further comprising: identifying thresholds in the non-braking mode according to a criteria that comprises at least one of: a designated speed associated with the motor vehicle, a designated acceleration associated with the motor vehicle, a designated speed associated with the engine, a designated acceleration associated with the engine, or any combination thereof.

47. A system for providing sequence modulated control of an LED array in running tail lights, in a motor vehicle, wherein the motor vehicle includes a braking system and an engine that is wired to an ignition system through an ignition wire, wherein the motor vehicle travels with a vehicle speed and a vehicle acceleration when in operation, wherein the engine rotates with a rotational speed and a rotational acceleration when in operation, and wherein the ignition system controls the firing of the engine when in operation, the system comprising:

a means for evaluating sensor inputs when the motor vehicle is in operation, wherein the sensor input signals are associated with either an engine operating condition, a vehicle operating condition, or a combination of the engine operating condition and the vehicle operating condition;

a means for evaluating a brake status associated with the braking system for the motor vehicle, wherein the brake status corresponds to either brake applied condition or brake released condition for the brake system;

a means for selecting an operating mode as a brake mode when the brake status corresponds to the brake applied condition;

a means for selecting the operating mode as a non-brake mode when the brake status corresponds to the brake released condition;

a means for generating sensor data responsive to the evaluated sensor inputs;

a means for adjusting at least one control of the LED array according to a first sequence that is responsive to the sensor data when the non-brake mode is selected, wherein a rate of activation associated with the first sequence is continuously adjusted irrespective of vehicle motion; and a means for adjusting at least one control to the LED array according to a second sequence when the braking mode is selected, wherein a rate of activation associated with the second sequence is independently controllable with respect to the rate of activation associated with the first sequence.

* * * * *